(12) United States Patent
Sakurai

(10) Patent No.: US 10,639,811 B2
(45) Date of Patent: May 5, 2020

(54) CUTTING APPARATUS

(71) Applicant: DISCO CORPORATION, Tokyo (JP)

(72) Inventor: Takatoshi Sakurai, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/174,514

(22) Filed: Oct. 30, 2018

(65) Prior Publication Data

US 2019/0134837 A1    May 9, 2019

(30) Foreign Application Priority Data

Nov. 6, 2017 (JP) ................. 2017-213647

(51) Int. Cl.
| *B26D 5/00* | (2006.01) |
| *B26D 7/01* | (2006.01) |
| *B26D 3/08* | (2006.01) |
| *B26D 1/18* | (2006.01) |
| *B23Q 1/62* | (2006.01) |
| *B23Q 17/24* | (2006.01) |
| *B23Q 3/08* | (2006.01) |
| *B23Q 39/02* | (2006.01) |

(52) U.S. Cl.
CPC ............ *B26D 5/007* (2013.01); *B23Q 1/621* (2013.01); *B23Q 3/088* (2013.01); *B23Q 17/2414* (2013.01); *B23Q 39/023* (2013.01); *B26D 1/18* (2013.01); *B26D 3/08* (2013.01); *B26D 3/085* (2013.01); *B26D 7/018* (2013.01)

(58) Field of Classification Search
CPC .......... B26D 5/00; B26D 5/005; B26D 5/007; B26D 3/08; B26D 3/085; B23D 7/00; B23D 7/01; B23D 7/018; B23D 7/02
See application file for complete search history.

(56) References Cited

U.S. PATENT DOCUMENTS

| 4,688,540 A * | 8/1987 | Ono ........................ B27B 31/06 125/13.01 |
| 6,102,023 A * | 8/2000 | Ishiwata ................ B28D 5/024 125/13.01 |
| 6,332,834 B1 * | 12/2001 | Nukui ..................... B24B 9/065 451/57 |
| 6,345,616 B1 * | 2/2002 | Umahashi ............ B28D 5/0076 125/13.01 |
| 6,348,943 B1 * | 2/2002 | Huang ................. B23D 59/002 348/92 |

(Continued)

FOREIGN PATENT DOCUMENTS

JP        2013251457 A    12/2013

*Primary Examiner* — Jennifer B Swinney
*Assistant Examiner* — Richard D Crosby, Jr.
(74) *Attorney, Agent, or Firm* — Greer Burns & Crain Ltd.

(57) ABSTRACT

A cutting apparatus includes a rotatable holding table having a rectangular holding surface, a cutting unit having a cutting blade mounted to a rotatable spindle, and a sensor unit detecting a tip of the cutting blade entering between a light projection section and a light reception section. The sensor unit has an upper end located to be lower than a lower end of the holding table in a Z direction and is located below the axis of the spindle or an extension region of the axis, and when short sides of the rectangular holding surface are set parallel to a Y direction, an upper side of the sensor unit is opened to allow the cutting blade to enter between the light projection section and the light reception section.

4 Claims, 5 Drawing Sheets

(56) References Cited

U.S. PATENT DOCUMENTS

| | | | | |
|---|---|---|---|---|
| 6,494,122 B2* | 12/2002 | Kamigaki | B23D 59/001 | 125/20 |
| 6,726,526 B2* | 4/2004 | Sekiya | B28D 5/0082 | 125/13.01 |
| 7,484,444 B2* | 2/2009 | Tokumitsu | B28D 5/0064 | 83/425.2 |
| 7,495,759 B1* | 2/2009 | Cheng | B23D 59/001 | 356/237.1 |
| 8,139,218 B2* | 3/2012 | Smeets | G03F 7/70716 | 356/401 |
| 8,470,691 B2* | 6/2013 | Saegusa | B23K 26/40 | 438/462 |
| 2003/0060022 A1* | 3/2003 | Peng | B23D 59/002 | 438/460 |
| 2003/0073382 A1* | 4/2003 | Manor | B23D 59/001 | 451/6 |
| 2004/0011176 A1* | 1/2004 | Sekiya | B28D 5/0058 | 83/401 |
| 2004/0025322 A1* | 2/2004 | Binnard | G03F 7/707 | 29/592.1 |
| 2005/0009302 A1* | 1/2005 | Wakui | H01L 21/78 | 438/464 |
| 2011/0132169 A1* | 6/2011 | Kapoor | B26D 1/0006 | 83/875 |
| 2012/0038763 A1* | 2/2012 | Kawada | B23B 25/06 | 348/95 |
| 2015/0194354 A1* | 7/2015 | Cheng | H01L 22/20 | 438/7 |
| 2015/0322443 A1* | 11/2015 | McCarty, II | B26D 5/06 | 83/13 |
| 2015/0358558 A1* | 12/2015 | McKenzie | H01L 27/14649 | 438/7 |
| 2019/0134837 A1* | 5/2019 | Sakurai | B26D 5/007 | |

* cited by examiner

CUTTING APPARATUS

BACKGROUND OF THE INVENTION

Field of the Invention

The present invention relates to a cutting apparatus cutting a plate-shaped workpiece held on a holding table by a cutting blade.

Description of the Related Art

In a cutting apparatus in which cutting is performed by causing a cutting blade mounted to a tip of a rotating spindle to cut a plate-shaped workpiece held on a holding surface of a holding table, the tip of the cutting blade is detected by a transmission-type sensor to recognize a diameter of the cutting blade, and a height position of the cutting blade when the tip of the cutting blade contacts the holding surface is recognized, and based on these pieces of information, a cutting-in depth of the cutting blade into the plate-shaped workpiece is controlled (see, for example, Japanese Patent No. 5936923).

Specifically, a difference between a height of the cutting blade when the tip of the cutting blade is detected by the transmission-type sensor and a height of the cutting blade when the tip of the cutting blade contacts the holding surface is preliminarily recognized by the cutting apparatus, and by adding a height position of the cutting blade when the tip of the cutting blade is detected by the transmission-type sensor to the difference, a height position of the cutting blade when the tip of the cutting blade contacts the holding surface is calculated.

In addition, also during cutting, the tip of the cutting blade is detected by the transmission-type sensor, and accordingly, wear of the tip of the cutting blade is detected. Thus, the cutting-in depth of the cutting blade is controlled according to the detected wear.

The transmission-type sensor is disposed at substantially the same height as the holding surface of the holding table, whereby a moving distance of the cutting blade in a height direction is reduced, thereby enhancing efficiency of detection of the tip of the cutting blade.

SUMMARY OF THE INVENTION

However, for reducing the moving distance of the cutting blade in the height direction by disposing the transmission-type sensor at substantially the same height as the holding surface of the holding table, it is necessary to dispose the transmission-type sensor at a position spaced apart from the holding table in an axial direction of the spindle, leading to a problem that the cutting apparatus is enlarged in length in the axial direction of the spindle. Particularly, when the holding table is formed in a rectangular shape to hold a rectangular plate-shaped workpiece, in order to avoid collision between a corner portion of the holding table and the transmission-type sensor at the time of rotation of the holding table, the transmission-type sensor needs to be disposed at a position spaced apart from the holding table in a horizontal direction, which makes the cutting apparatus much larger.

In addition, when the transmission-type sensor is disposed on an outer side of the holding table in the axial direction of the spindle, the cutting blade needs to largely move in the axial direction of the spindle in order that the tip of the cutting blade is detected by the transmission-type sensor, which causes a lowering in productivity.

It is therefore an object of the present invention to efficiently detect a tip of a cutting blade by a transmission-type sensor while preventing a cutting apparatus from being enlarged in length in the axial direction of a spindle.

In accordance with an aspect of the present invention, there is provided a cutting apparatus including a holding table having a rectangular holding surface holding a rectangular plate-shaped workpiece, a rotating unit rotating the holding table with a center of the holding table as an axis, a cutting unit having a cutting blade mounted to a rotatable spindle and cutting the plate-shaped workpiece held on the holding table, a sensor unit in which a light projection section projecting detection light and a light reception section receiving the detection light are disposed to face each other, the sensor unit detecting a tip of the cutting blade entering between the light projection section and the light reception section, a Z moving unit causing the cutting unit to move in a Z direction which is a direction perpendicular to the rectangular holding surface, a Y moving unit causing the cutting unit to move in a Y direction which is an axial direction of the spindle and orthogonal to the Z direction, and an X moving unit causing the holding table to move in an X direction which is a cutting direction of the cutting blade and orthogonal to the Z direction and the Y direction. The rectangular holding surface has short sides and long sides, and the sensor unit has an upper end disposed to be lower than a lower end of the holding table in the Z direction and is located below the axis of the spindle or an extension region of the axis, and when the short sides of the rectangular holding surface are set parallel to the Y direction, an upper side of the sensor unit is opened to allow the cutting blade to enter between the light projection section and the light reception section.

The cutting apparatus according to the present invention has a configuration in which the upper end of the sensor unit is disposed to be lower than the lower end of the holding table in the Z direction, the sensor unit is located, in the Z direction, below the axis of the spindle or an extension region of the axis, and when the short sides of the rectangular holding surface are set parallel to the Y direction, the upper side of the sensor unit is opened to allow the cutting blade to enter between the light projection section and the light reception section. According to this configuration, there is no risk of collision between a corner portion of the holding table and the transmission-type sensor even when the holding table is rotated, and therefore, it is unnecessary to dispose the sensor unit at a position spaced apart from the holding table in the axial direction of the spindle. Accordingly, the cutting blade can be made to enter between the light projection section and the light reception section of the sensor unit without largely moving the cutting blade in the spindle's axial direction (Y direction), so that productivity can be prevented from being lowered. In addition, the cutting apparatus can be prevented from being enlarged in length in the axial direction of the spindle.

The above and other objects, features and advantages of the present invention and the manner of realizing them will become more apparent, and the invention itself will best be understood from a study of the following description and an appended claim with reference to the attached drawings showing a preferred embodiment of the invention.

DETAILED DESCRIPTION OF THE PREFERRED EMBODIMENT

Figure 1:
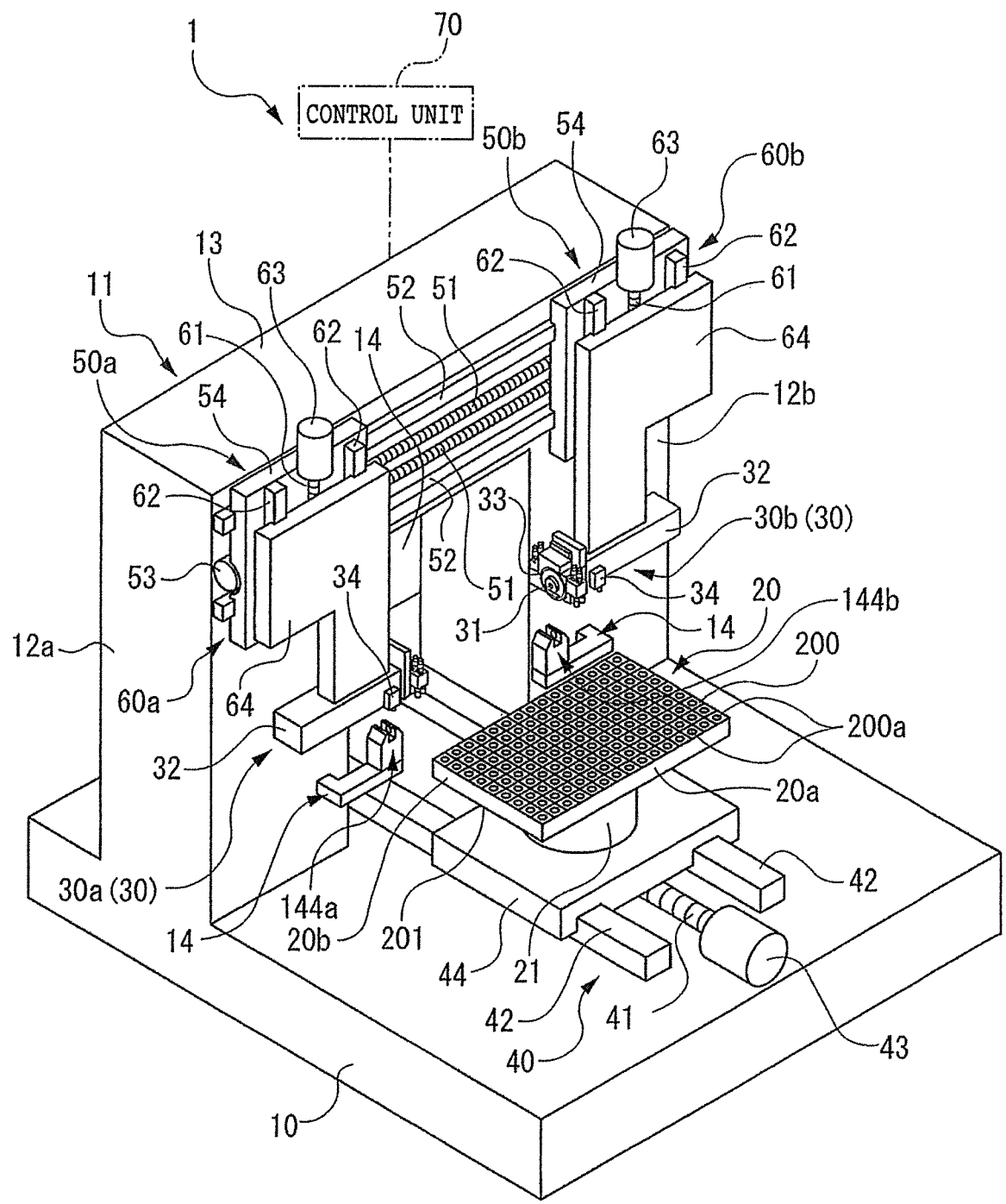
FIG. 1 is a perspective view illustrating an example of a cutting apparatus.
Figure 1:
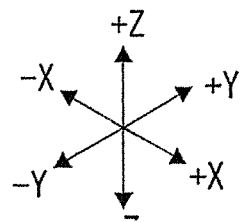

A cutting apparatus 1 illustrated in FIG. 1 is an apparatus cutting a plate-shaped workpiece held on a holding table 20 by a cutting unit (cutting means) 30. The cutting unit 30 includes a first cutting unit (first cutting means) 30a and a second cutting unit (second cutting means) 30b.

The holding table 20 is formed in a rectangular shape, and a rectangular holding surface 200 on which a rectangular plate-shaped workpiece is held by suction is formed on an upper surface of the holding table 20. The rectangular holding surface 200 has suction holes 200a for sucking each of devices constituting the plate-shaped workpiece formed therein. The holding table 20 is of a type of holding the rectangular plate-shaped workpiece by suction, and has two long sides 20a and two short sides 20b.

Under the holding table 20 is disposed a rotating unit (rotating means) 21 rotating the holding table 20 with the center of the holding table 20 as an axis. The rotating unit 21 is, for example, a pulse motor. The axis of the rotating unit 21 is connected to a lower surface of the holding table 20, and the holding table 20 can be driven by the rotating unit 21 to rotate by a predetermined angle.

The holding table 20 is driven by an X moving unit (X moving means) 40 to be moved in an X direction. Here, the X direction is a direction (cutting feeding direction) in which the holding table 20 is moved at the time of cutting the plate-shaped workpiece held on the holding table 20. The X moving unit 40 is disposed on an upper surface side of a base 10. The X moving unit 40 includes a ball screw 41 extending in the X direction, a pair of guide rails 42 disposed in parallel to the ball screw 41, a motor 43 connected to one end of the ball screw 41, and a table base 44 which is provided therein with a nut for screw engagement with the ball screw 41 and a bottom portion of which makes sliding contact with the guide rails 42. The rotating unit 21 is fixed to an upper portion of the table base 44, and when the table base 44 is guided by the guide rails 42 and moved in the X direction with the ball screw 41 rotated by the motor 43, the holding table 20 and the rotating unit 21 are also moved in the X direction.

Figure 2:
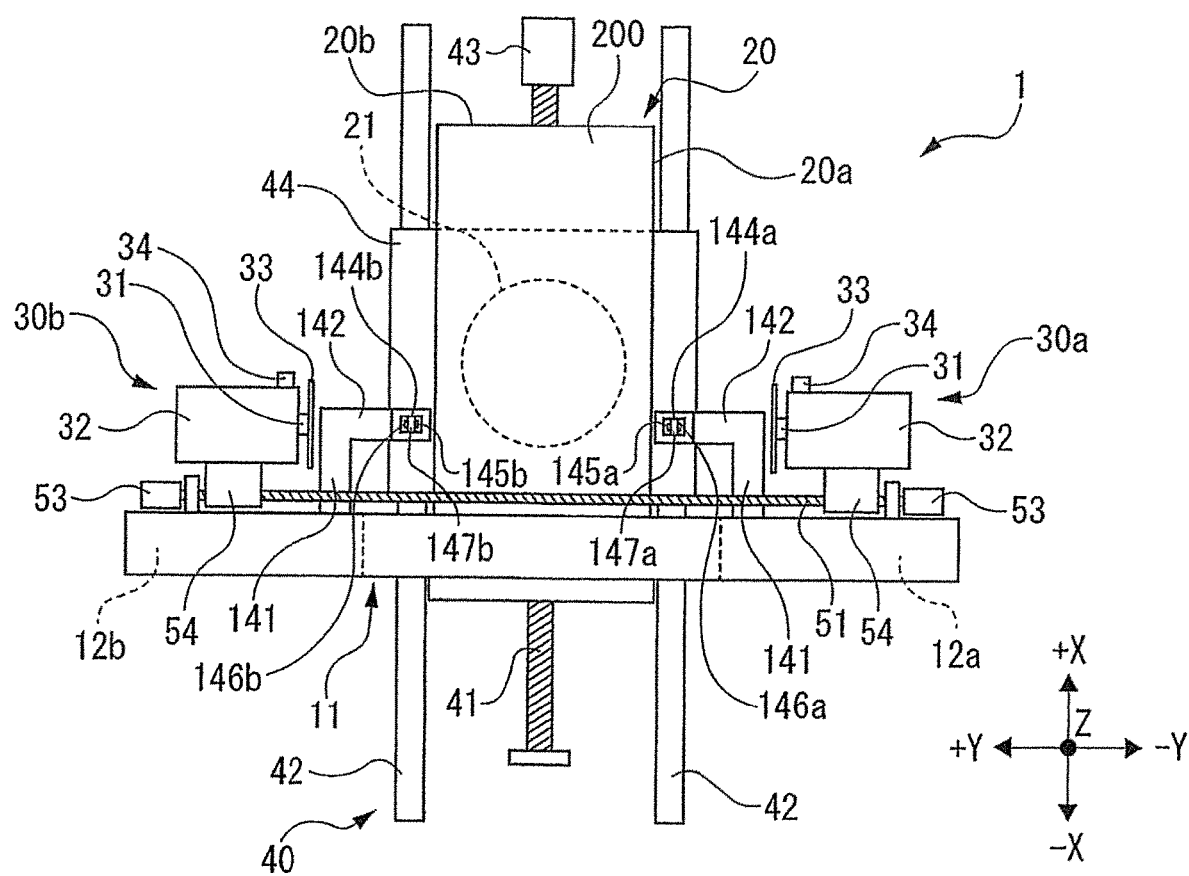
FIG. 2 is a plan view illustrating part of the cutting apparatus.

As illustrated in FIG. 2, each of the first cutting unit 30a and the second cutting unit 30b includes a rotatable spindle 31 having an axis in a Y direction perpendicular to the X direction, a housing 32 supporting the spindle 31 so as to be rotatable, and a cutting blade 33 mounted to a tip of the spindle 31. An imaging unit (imaging means) 34 adapted to image the plate-shaped workpiece is disposed on a side surface of the housing 32. Note that, in FIG. 2, the first cutting unit 30a and the second cutting unit 30b illustrated in FIG. 1 are depicted in a simplified form.

As illustrated in FIG. 1, a gate-formed column 11 is disposed in an erect state on the upper surface side of the base 10. The gate-formed column 11 includes two pillar sections 12a and 12b each disposed on either side of a moving path of the holding table 20 and extending in a Z direction which is a direction perpendicular to the rectangular holding surface 200 (a direction perpendicular to the X direction and the Y direction), and a bridging section 13 disposed in a bridging manner between upper portions of the pillar sections 12a and 12b.

On a side surface on one side (+X side) of the bridging section 13, there are disposed a first Y moving unit (first Y moving means) 50a moving the first cutting unit 30a in the Y direction orthogonal to the Z direction, and a second Y moving unit (second Y moving means) 50b moving the second cutting unit 30b in the Y direction.

Since the first Y moving unit 50a and the second Y moving unit 50b are configured in the same manner, common reference characters will be used in the following description. The first Y moving unit 50a and the second Y moving unit 50b each include a ball screw 51 extending in the Y direction, a pair of guide rails 52 disposed in parallel to the ball screw 51, a motor 53 connected to one end of the ball screw 51, and a moving base 54 which is provided therein with a nut for screw engagement with the ball screw 51 and a side portion of which makes sliding contact with the guide rails 52. The respective moving bases 54 have a first Z moving unit (first Z moving means) 60a and a second Z moving unit (second Z moving means) 60b disposed thereon. The first Z moving unit (first Z moving means) 60a moves the first cutting unit 30a in the Z direction, and the second Z moving unit (second Z moving means) 60b moves the second cutting unit 30b in the Z direction. The respective moving bases 54 support the first cutting unit 30a and the second cutting unit 30b through the first Z moving unit 60a and the second Z moving unit 60b, respectively. With the ball screw 51 rotated by the motor 53, each of the moving bases 54 is guided by the guide rails 52 to be moved in the Y direction, and attendant on this, the first Z moving unit 60a and the first cutting unit 30a are moved in the Y direction, and the second Z moving unit 60b and the second cutting unit 30b are moved in the Y direction.

Since the first Z moving unit 60a and the second Z moving unit 60b are configured in the same manner, common reference characters will be used in the following description. The first Z moving unit 60a and the second Z moving unit 60b each include a ball screw 61 extending in the Z direction, a pair of guide rails 62 disposed in parallel to the ball screw 61, a motor 63 connected to one end of the ball screw 61, and a moving base 64 which is provided therein with a nut for screw engagement with the ball screw 61 and a side portion of which makes sliding contact with the guide rails 62. The respective moving bases 64 support the first cutting unit 30a and the second cutting unit 30b. With the ball screw 61 rotated by the motor 63, the moving base 64 is guided by the guide rails 62 to be moved in the Z direction, and attendant on this, the first cutting unit 30a and the second unit 30b are each moved in the Z direction.

The X moving unit 40, the first Y moving unit 50a, the second Y moving unit 50b, the first Z moving unit 60a, and the second Z moving unit 60b are controlled by a control unit 70. The control unit 70 includes at least a central processing unit (CPU) and a memory.

As illustrated in FIG. 2, each of brackets 14 is attached to a side surface of each of the two pillar sections 12a and 12b constituting the gate-formed column 11. The brackets 14 each include a base section 141 one end of which is attached to each of the pillar section 12a and 12b and which extends in the +X direction, and an arm section 142 which extends in the Y direction and in a mutually approaching direction from a tip of the base section 141. Each of sensor units 144a and 144b detecting a tip of the cutting blade 33 is disposed on an upper portion of each of the arm sections 142. The sensor unit 144a includes a light projection section 145a and a light reception section 146a disposed to face each other, and light projected in the Y direction by the light projection section 145a is received by the light reception section 146a. Similarly, the sensor unit 144b includes a light projection section 145b and a light reception section 146b, and light projected in the Y direction by the light projection section 145b is received by the light reception section 146b. An entered section 147a as a gap into which the corresponding cutting blade 33 is made to enter is formed between the light projection section 145a and the light reception section 146a. Similarly, An entered section 147b as a gap into which the corresponding cutting blade 33 is made to enter is formed between the light projection section 145b and the light reception section 146b.

Upper ends of the sensor units 144a and 144b are located to be lower than a lower end 201 of the holding table 20, and optical axes of the sensor units 144a and 144b are located below extension directions of the axes of the spindles 31 each constituting each of the first cutting unit 30a and the second cutting unit 30b. Specifically, since the cutting blades 33 each constituting each of the first cutting unit 30a and the second cutting unit 30b move in the Y direction and the Z direction, the sensor units 144a and 144b are each disposed in moving ranges in the Y direction and the Z direction of each of the cutting blades 33, the sensor unit 144a is disposed in the moving range of the cutting blade 33 constituting the first cutting unit 30a, and the sensor unit 144b is disposed in the moving range of the cutting blade 33 constituting the second cutting unit 30b.

In other words, the sensor units 144a and 144b are located below the axes of the spindles 31 or extension regions of the axes.

Note that the first Y moving unit 50a moving the first cutting unit 30a in the Y direction orthogonal to the Z direction and the second Y moving unit 50b moving the second cutting unit 30b in the Y direction may be disposed on a side surface on the other side (−X side) of the bridging section 13. In that case, the first Z moving unit 60a and the second Z moving unit 60b, as well as the first cutting unit 30a and the second cutting unit 30b are also disposed on the −X side of the bridging section 13. In addition, corresponding to the positions where the first cutting unit 30a and the second cutting unit 30b are disposed, the sensor units 144a and 144b are attached respectively to the pillar sections 12a and 12b by the brackets 14.

As illustrated in FIG. 2, when the holding table 20 is rotated by the rotating unit 21 to set the long sides 20a of the rectangular holding surface 200 parallel to the X direction and to set the short sides 20b parallel to the Y direction, the upper side of the sensor units 144a and 144b is opened regardless of a position of the holding table 20 in the X-direction, so that the cutting blades 33 can be made to enter each of the entered section 147a between the light projection section 145a and the light reception section 146a and the entered section 147b between the light projection section 145b and the light reception section 146b. On the other hand, when the long sides 20a of the holding table 20 are set parallel to the Y direction and the short sides 20b are set parallel to the X direction, the holding table 20 is located on the upper side of each of the sensor units 144a and 144b, depending on a position of the holding table 20 in the X-direction, so that the cutting blade 33 cannot be made to enter each of the entered section 147a of the sensor unit 144a and the entered section 147b of the sensor unit 144b.

In the cutting apparatus 1 configured as above, for accurate control of a cutting-in depth into the plate-shaped workpiece held on the holding table 20, an operation called setup in which the control unit 70 is caused to recognize a height position of each of the first cutting unit 30a and the second cutting unit 30b in the Z direction at the time of contact of each of the cutting blades 33 with the rectangular holding surface 200 of the holding table 20 by use of each of the sensor units 144a and 144b is performed as preparation before starting cutting. The setup is conducted for both the first cutting unit 30a and the second cutting unit 30b individually and by the same technique. In the following, however, only the setup for the first cutting unit 30a will be described.

Figure 4:
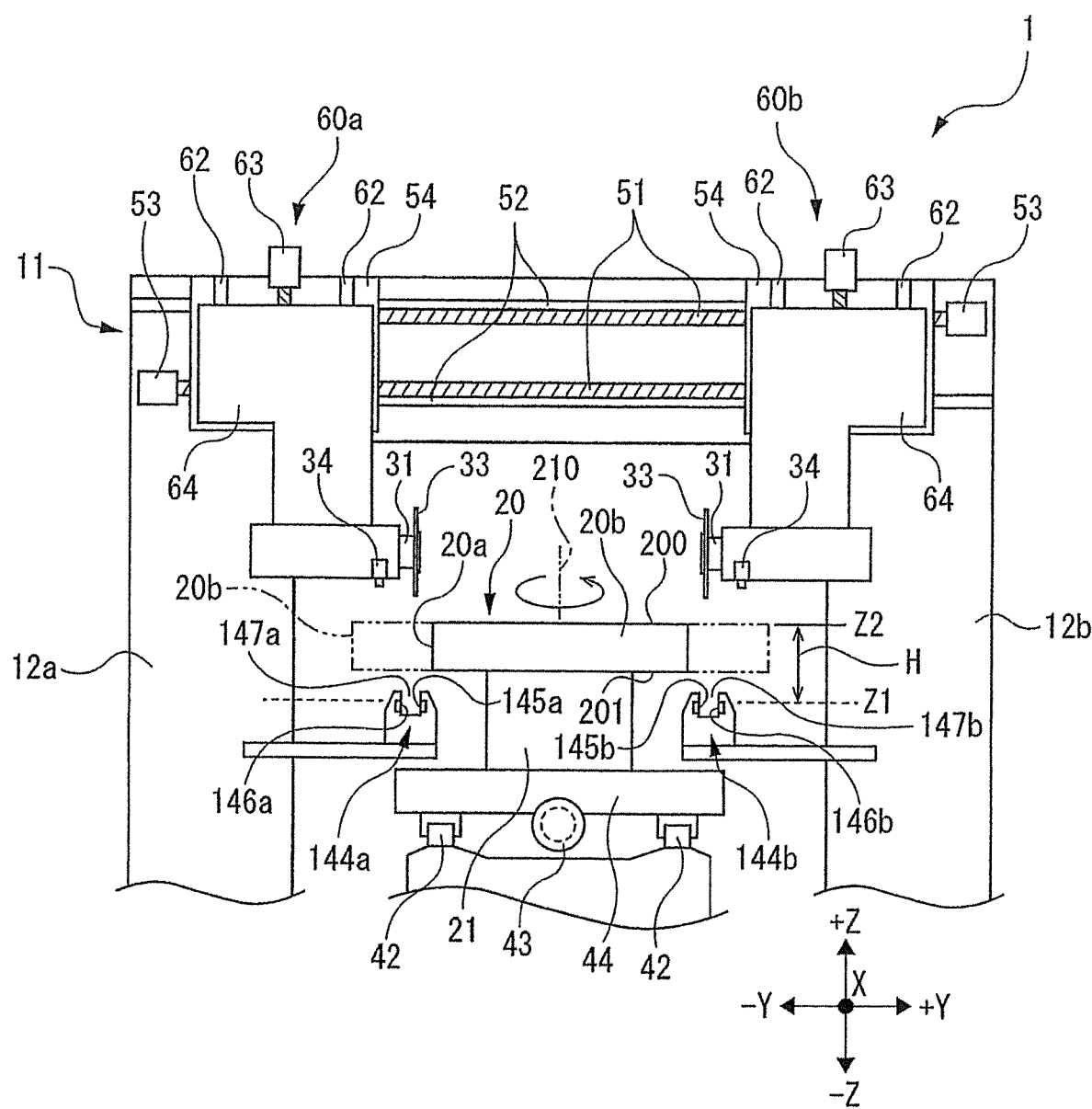
FIG. 4 is a side view illustrating part of the cutting apparatus.

First, a state is provided in which the holding table 20 is not present on the upper side of the sensor units 144a and 144b and at least the upper side of the entered sections 147a and 147b is open. For example, as illustrated in FIG. 1, the holding table 20 is retracted in the +X direction, resulting in a state in which an end portion on the −X side of the holding table 20 is located on the +X side of end portions on the +X side of the sensor units 144a and 144b. Alternatively, as illustrated in FIG. 2, the rotating unit 21 rotates the holding table 20 with a center 210 (see FIG. 4) of the holding table 20 as a center, to result in a state in which the short sides 20b of the holding table 20 are parallel to the Y direction.

Next, the first Y moving unit 50a moves the first cutting unit 30a in the Y direction, whereby the cutting blade 33 constituting the first cutting unit 30a is positioned directly above the sensor unit 144a. Then, the first Z moving unit 60a gradually lowers the first cutting unit 30a in the Z direction, to move the lower end of the cutting blade 33 into the entered section 147a of the sensor unit 144a. As a result, detection light projected from the light projection section 145a is shielded by the cutting blade 33, resulting in that the detection light cannot be detected by the light reception section 146a, whereby the tip of the cutting blade 33 is detected. The control unit 70 recognizes a Z-directional height position Z1 (see FIG. 4) of the first cutting unit 30a when it becomes impossible to detect the light by the light reception section 146a, based on a rotational angle of the motor 63 of the first Z moving unit 60a, or the like.

In addition, the control unit 70 preliminarily recognizes a difference H (see FIG. 4) between the height position Z1 and a Z-directional height position Z2 of the first cutting unit 30a when the cutting blade 33 contacts the rectangular holding surface 200 of the holding table 20, and by adding H to Z1, the control unit 70 calculates the Z-directional height position Z2 of the first cutting unit 30a when the cutting blade 33 contacts the rectangular holding surface 200.

Figure 5:
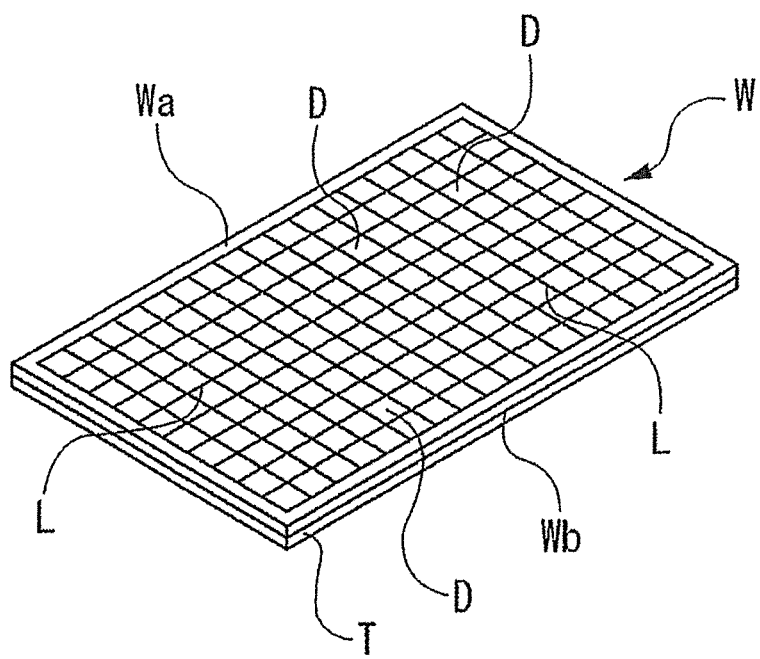
FIG. 5 is a perspective view illustrating an example of a plate-shaped workpiece.

After the setup is finished by calculating the respective Z2 values for the first cutting unit 30a and the second cutting unit 30b in this way, the plate-shaped workpiece W as illustrated in FIG. 5, for example, is held on the rectangular holding surface 200 of the holding table 20 by suction. Note that holding of the plate-shaped workpiece W on the holding table 20 may be performed before the start of the setup.

This plate-shaped workpiece W is formed in a rectangular parallelepiped shape (rectangular in shape in plan view) of which a longitudinal length and a transverse length are different, and a front surface Wa is formed with division lines L in the longitudinal and transverse directions, with devices D formed in regions partitioned by the division lines L. A tape T is adhered to a back surface Wb of the plate-shaped workpiece W, and the tape T side is held on the rectangular holding surface 200 of the holding table 20.

Then, the holding table 20 with the rectangular plate-shaped workpiece W held on the rectangular holding surface 200 thereof is moved in the −X direction, and the imaging unit 34 of each of the first cutting unit 30a and the second cutting unit 30b is moved above the plate-shaped workpiece W by each of the first Y moving unit 50a and the second Y moving unit 50b.

Next, the front surface Wa of the plate-shaped workpiece W is imaged by each of the imaging units 34, and the division line L to be cut is detected by image processing such as pattern matching. Then, the control unit 70 drives the first Y moving unit 50a and the second Y moving unit 50b, to perform the Y directional alignment of the detected division line L to be cut and the cutting blades 33.

Subsequently, the control unit 70 drives the first Z moving unit 60a and the second Z moving unit 60b, to lower the first cutting unit 30a and the second cutting unit 30b, thereby positioning the lower ends of the rotating cutting blades 33 at positions which are below the back surface Wb of the plate-shaped workpiece W and above the rectangular holding surface 200. Then, the X moving unit 40 moves the holding table 20 in the −X direction, whereby cutting is conducted along the division line L. In this instance, the lower ends of the cutting blades 33 cut into the plate-shaped workpiece W to the tape T. As a result, the plate-shaped workpiece W is cut along the division line L.

Next, the first Y moving unit 50a and the second Y moving unit 50b move the first cutting unit 30a and the second cutting unit 30b respectively by a distance between the adjacent division lines L, and cutting of the plate-shaped workpiece W is similarly performed along the next division line L. The cutting of the plate-shaped workpiece W is thus conducted successively along the division lines L, and after the plate-shaped workpiece W is cut along all the division lines L in the same direction, the rotating unit 21 rotates the holding table 20 with the center 210 of the holding table 20 illustrated in FIG. 4 as a center by 90 degrees, and cutting is similarly performed, to cut the plate-shaped workpiece W along all the division lines L in the longitudinal and transverse directions, whereby the plate-shaped workpiece W is divided into individual chips.

When cutting is conducted in this way, the tips of the cutting blades 33 are worn. Therefore, at an arbitrary timing during the cutting, degrees of wear are calculated, and the cutting-in depth of the cutting blades 33 into the plate-shaped workpiece W are controlled according to the degrees of wear. For example, the degrees of wear are calculated after the cutting of the plate-shaped workpiece W is performed along a predetermined number of the division lines L, or after the cutting of the plate-shaped workpiece W is conducted over a predetermined distance.

Figure 3:
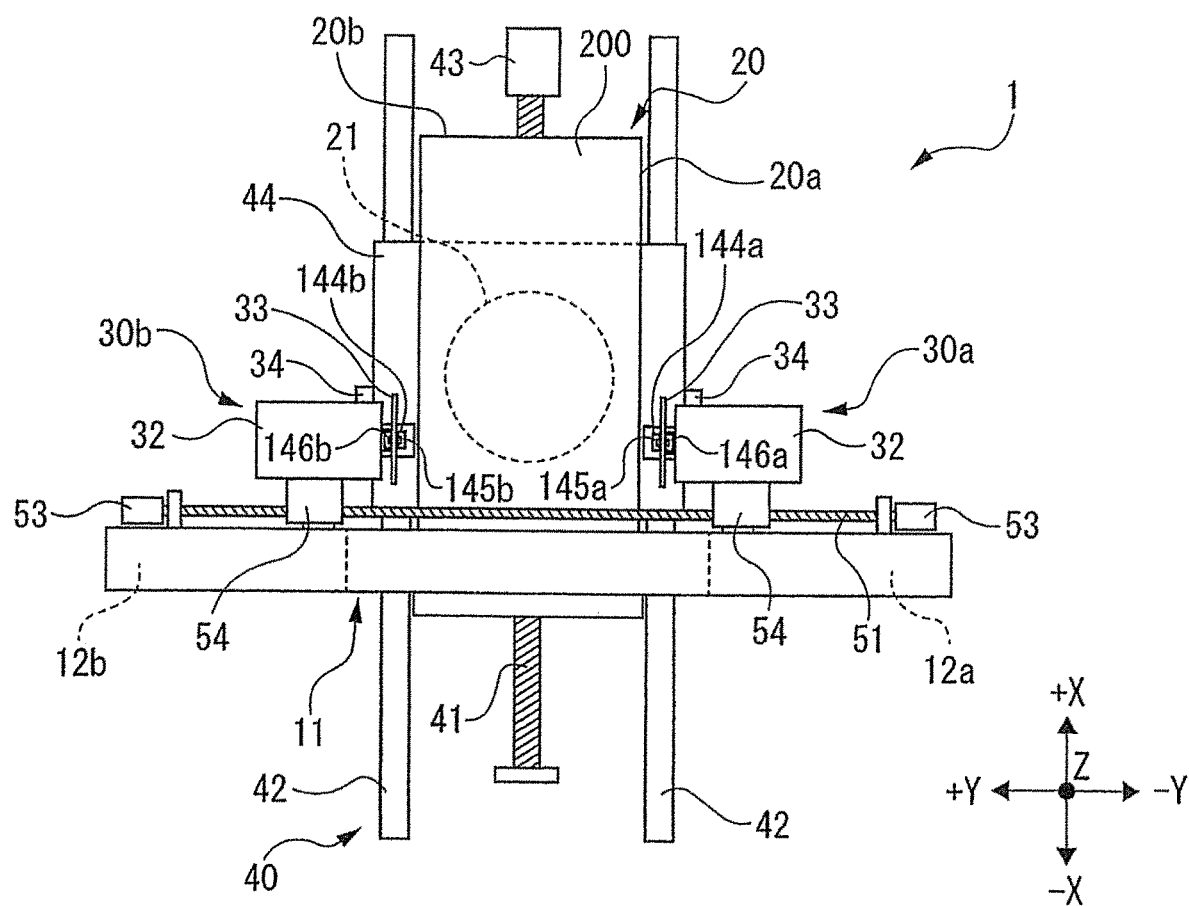
FIG. 3 is a plan view illustrating a state in which a cutting blade is detected by a sensor unit.

As illustrated in FIGS. 2 and 3, in a state in which the long sides 20a of the holding table 20 are parallel to the X direction and the short sides 20b are parallel to the Y direction, the upper side of the sensor units 144a and 144b is open, so that the tips of the cutting blades 33 can be detected by causing the cutting blades 33 to enter the entered sections 147a and 147b, in the same manner as at the time of setup, without rotating the holding table 20. On the other hand, in a case where the long sides 20a of the holding table 20 are parallel to the Y direction and the short sides 20b are parallel to the X direction and where the holding table 20 is located above the sensor unit 144a or 144b, the holding unit 20 is rotated by 90 degrees to open the upper side of the sensor units 144a and 144b, and then, the cutting blades 33 are similarly caused to enter the entered sections 147a and 147b. Then, the tips of the cutting blades 33 are detected.

In a case where the control unit 70 recognizes Z-directional positions Z3 (not illustrated) of the first cutting unit 30a and the second cutting unit 30b when the tips of the cutting blades 33 are detected and the values of the positions are smaller than the Z1 values at the time of setup, the control unit 70 calculates (Z1−Z3), and uses the calculated values as correction values. Note that, in a case where the value of (Z1−Z3) is equal to or greater than a predetermined value, the control unit 70 determines that the cutting blade 33 is to be replaced, and informs an operator of the determined result.

After the correction values are obtained, cutting of the plate-shaped workpiece W is restarted. The Z-directional positions of the first cutting unit 30a and the second cutting unit 30b at the time of cutting are set to positions which are lower than those before wear detection by amounts corresponding to the correction values. On the other hand, when the cutting blade 33 is replaced by a new one, the same setup as above is conducted, before starting the cutting. In this way, wear of the cutting blades 33 is coped with, whereby the cutting-in depths of the cutting blades 33 into the plate-shaped workpiece W can be controlled.

As has been described above, in the cutting apparatus 1, the sensor units 144a and 144b are disposed in such a manner that the upper ends of the sensor units 144a and 144b are lower than the lower end of the holding table 20 in Z-directional position. In addition, when the short sides 20b of the rectangular holding surface 200 are set parallel to the Y direction, the upper side of the sensor units 144a and 144b is opened to allow each of the cutting blades 33 to enter each of the entered section 147a between the light projection section 145a and the light reception section 146a and the entered section 147b between the light projection section 145b and the light reception section 146b. As a result, even when the holding table 20 is rotated, there is no risk of collision between a corner portion of the holding table 20 and the sensor unit 144a or 144b, and therefore, it is unnecessary to dispose the sensor units 144a and 144b at positions spaced apart from the holding table 20 in the axial direction of the spindles 31. For this reason, it is possible to prevent the cutting device 1 from being enlarged in length in the axial direction of the spindles 31. Besides, when each of the cutting blades 33 is caused to enter each of the entered section 147a of the sensor unit 144a and the entered section 147b of the sensor unit 144b, it is unnecessary to largely move the cutting blades 33 in the axial direction of the spindles 31 (Y direction), and therefore, productivity can be prevented from being lowered.

Note that, although the sensor units 144a and 144b are attached to the respective side surfaces of the pillar sections 12a and 12b of the gate-formed column 11 through the brackets 14 in the cutting apparatus 1 illustrated in FIGS. 1 to 4, the positions to attach the sensor units are not limited to the pillar sections 12a and 12b. For example, the sensor units may be disposed on bases provided on the base 10. Also in the case of using the brackets, attachment positions and shapes of the brackets are not limited to those illustrated in FIGS. 1 to 4.

In addition, while the above cutting apparatus 1 includes the two cutting units 30a and 30b, only one cutting unit may be provided.

The present invention is not limited to the details of the above described preferred embodiment. The scope of the invention is defined by the appended claim and all changes and modifications as fall within the equivalence of the scope of the claim are therefore to be embraced by the invention.

What is claimed is:
1. A cutting apparatus comprising:
  a holding table having a rectangular holding surface holding a rectangular plate-shaped workpiece;

a rotating unit rotating the holding table with a center of the holding table as an axis;

a cutting unit having a cutting blade mounted to a rotatable spindle and cutting the plate-shaped workpiece held on the holding table;

a sensor unit in which a light projection section projecting detection light and a light reception section receiving the detection light are disposed to face each other, the sensor unit detecting a tip of the cutting blade entering between the light projection section and the light reception section;

a Z moving unit causing the cutting unit to move in a Z direction which is a direction perpendicular to the rectangular holding surface;

a Y moving unit causing the cutting unit to move in a Y direction which is an axial direction of the spindle and orthogonal to the Z direction; and an X moving unit causing the holding table to move in an X direction which is a cutting direction of the cutting blade and orthogonal to the Z direction and the Y direction, wherein the rectangular holding surface has short sides and long sides, and the sensor unit has an upper end disposed to be lower than a lower end of the holding table in the Z direction and is located below an axis of the spindle of the cutting unit in the Z direction, and when the short sides of the rectangular holding surface are set parallel to the Y direction, an upper side of the sensor unit is open to allow the cutting blade to enter between the light projection section and the light reception section.

2. The cutting apparatus as defined in claim 1, wherein the sensor unit is located within a moving range in the Y direction and the Z direction of the cutting blade.

3. The cutting apparatus as defined in claim 1, wherein the sensor unit includes a first sensor and a second sensor spaced from the first sensor in the Y direction.

4. The cutting apparatus as defined in claim 1, wherein a distance between the first sensor and the second sensor is longer than the short sides of the holding surface and shorter than the long sides of the holding surface.

* * * * *